Patented Feb. 16, 1926.

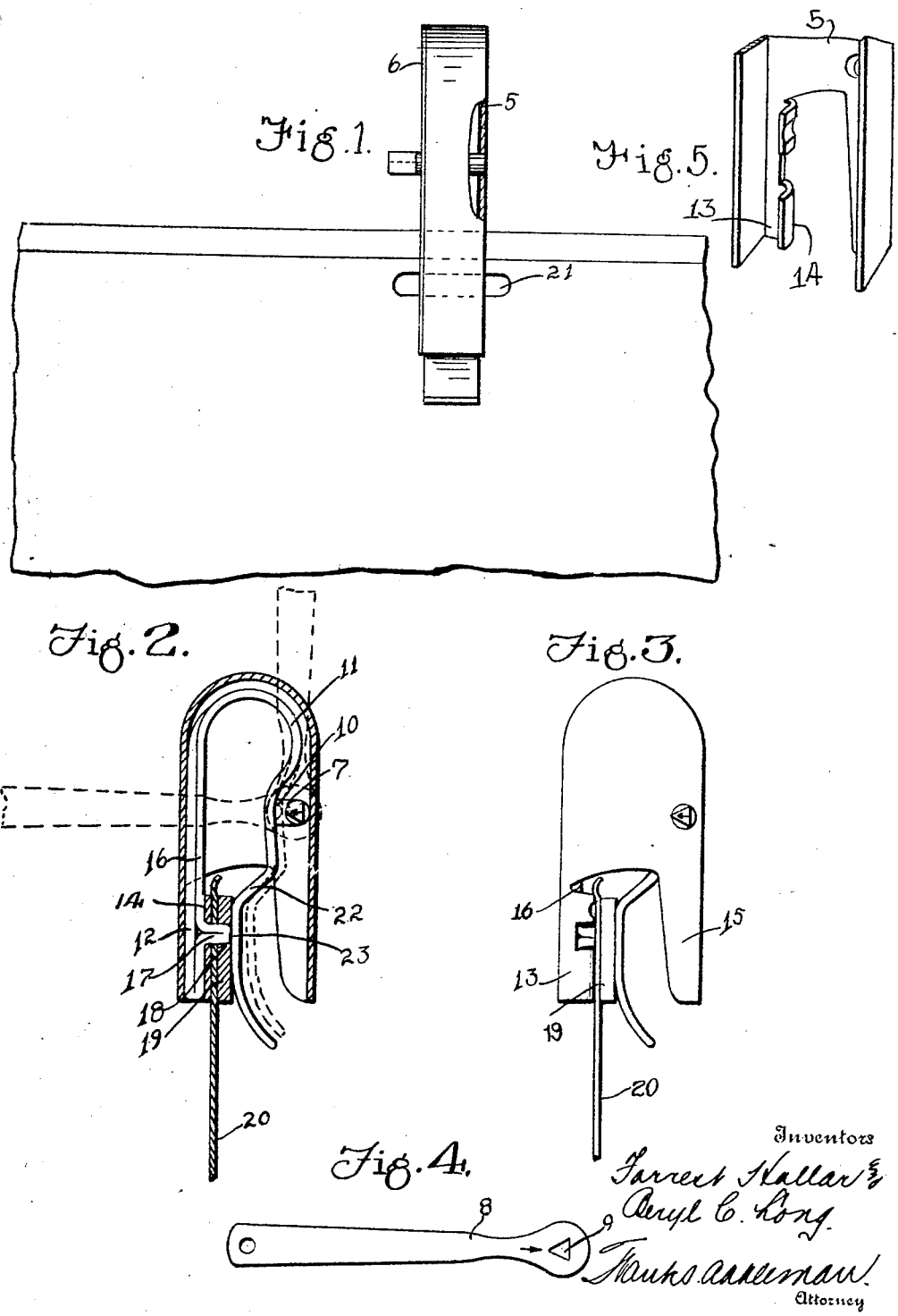

1,573,443

UNITED STATES PATENT OFFICE.

FORREST HALLAR, OF BLAIRSTOWN, MISSOURI, AND BERYL C. LONG, OF TOPEKA, KANSAS.

LICENSE-PLATE HOLDER.

Application filed July 18, 1924. Serial No. 726,750.

*To all whom it may concern:*

Be it known that we, FORREST HALLAR and BERYL C. LONG, citizens of the United States of America, and residents of Blairstown, in the county of Henry and State of Missouri, and Topeka, in the county of Shawnee and State of Kansas, have invented certain new and useful Improvements in License-Plate Holders, of which the following is a specification.

This invention relates to tag or license plate holders, particularly adapted for use on automobiles, and the invention has for an object the provision of novel means whereby a tag or license plate, to be hereinafter referred to as a "license plate", may be held in association with a support.

A device embodying the invention has means for removably securing a license plate, and the said means will not become accidentally disarranged to a degree as to release the license plate, except when the parts are properly manipulated, as will presently appear.

It is an object of this invention to produce a holder for a license plate in which the parts thereof are protected from moisture, due to rain or the like; and the said invention is constructed to be readily applied to or removed from the support or bracket, and when properly manipulated, the license plate may be also readily removed.

A further object of this invention is to produce a holder of the character indicated which will be durable and efficient.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a license plate showing it in assembled relation to a device embodying the invention;

Fig. 2 illustrates a vertical sectional view thereof;

Figure 3 illustrates a view in side elevation of the license plate holder showing the end of the plate in place; and Figure 4 illustrates a plan view of a wrench or key for operating the retaining mechanism of the holder.

In these drawings, 5 denotes a casing or housing, which, in the present embodiment of the invention, comprises a side plate with flanged edges forming a housing in which the operating mechanism is seated, the said mechanism being enclosed by a face plate 6 which is secured to the housing in any appropriate manner.

A cam 7 has trunnions journaled in the side plate and the face plate of the housing, one of the said trunnions being extended to be engaged by a key or wrench 8, the socket 9 of the key or wrench being of the configuration of the extension in cross section. The cross sectional configuration of the extension may be changed to suit particular requirements, and the key may be used to rotate the trunnions to change the position of the cam, as will be apparent. The face of the cam, as here shown, has two spring engaging projections or lugs 10 and this construction will prevent the accidental displacement of the cam, since it will have two points of contact with the spring 11 with which it coacts to hold the license plate in place, as will presently appear.

The spring, in the present embodiment of the invention, comprises a strip of metal doubled on itself as shown at 12, and the parallel portions of the spring thus formed occupy a position at the rear of the housing and its extension 13. The extension of the housing and the extended side plate are relied upon to hold the looped end of the spring, and as a means for producing a seat in which the looped end of the spring may be stationed, the extension of the side plate is bent inwardly to form a flange 14 that extends partially across the inner surface of the spring, in which position the spring is held by the extension 15 of the face plate 6. The face plate may be secured in place by any suitable fastening, or it may be braced or otherwise secured by a fusible agency and the inventors do not wish to be limited with respect to this detail of construction.

The inner layer or leaf 16 of the spring is shaped to form a lug or projection 17 which may fit in a slot 18 of a supporting element 19. The supporting element for the license plate holder may be in the shape of a bracket, bar or the like, carried by the automobile structure, and as that is a matter of location that may be changed to suit individual designers or users, no attempt has been made to illustrate the supporting element as associated with the automobile, as one skilled in the art will understand its application.

As all of the conventional types of license plates 20 have slots 21 formed in them for the reception of fastenings, the projection or lug 17 is of such a length that it will project through the bracket and into the slot of the license plate. The tongue or freely movable end 22 of the spring is the part that is engaged by the cam, as shown, the said cam bearing against a relatively straight surface of the said spring. The free end of the spring also has a relatively straight portion 23 intended to bear against the license plate to hold it on the shoulder or lug 17, and when the parts are operated to cause them to assume positions as shown in Fig. 2, the license plate will be effectively held against accidental displacement, except, of course, where undue force or impact is imparted to the mechanism or device.

It will be obvious from an inspection of the drawing that when the parts are in the positions in which they are illustrated in Fig. 2, the license plate will be locked or attached in place, and that when the license plate is to be removed, the key or wrench 8 shown in Fig. 2 in dotted lines may be moved from the horizontal to the vertical position in which it is shown, and when such movement occurs, the cam will be adjusted to release the tongue or free end of the spring 22 so that it will assume the dotted line position shown in Fig. 2. The movement afforded the free end of the tongue will result in freeing the license plate in order that it may be removed, and after it is removed, the license plate holder will be removed from the bracket, if desired, by withdrawing the lug 17 from the slot of the bracket or supporting element 19.

The casing and face plate of this invention may be manufactured by the stamping processes, and the tongue with its accompanying configuration can also be produced by the stamping and bending processes now commonly used so that the production of the device will be accomplished expeditiously and comparatively inexpensively.

We claim:

1. In a holder for license plates, a casing having a side with an extension, the side of the extension being inturned to form a flange, a spring doubled on itself, the doubled portion of the said spring being seated in the extension under the said flange, a projection formed as a part of the spring adapted to enter a slot of a bracket and a slot of a license plate, the said spring having a free end extending across the end of the projection and coacting therewith to retain the device in operative relation to its support and the license plate, and a cam journaled in the casing in position to bear against the extension for holding it in operative position.

2. In a holder for license plates, a casing, a cam having a trunnion journaled therein, a spring doubled on itself for a portion of its length lying in the casing, one leaf of the spring having an outwardly extending doubled side forming a projection adapted to enter a slot of a bracket and a slot of a license plate, the said spring having a portion overlying the end of the projection and in position to be engaged by the said cam whereby the cam moves the extension of the spring into engagement with the projection.

3. In a holder for license plates, a casing, a spring doubled on itself and lying in the casing, means for holding the spring in the casing, one leaf of the doubled portion of the spring having an outwardly extending doubled side forming a projection adapted to enter a slot of a bracket and a slot of a license plate, and means for moving a portion of the spring into engagement with the said projection.

FORREST HALLAR.
BERYL C. LONG.